United States Patent
Sasahara

(10) Patent No.: US 11,599,494 B2
(45) Date of Patent: Mar. 7, 2023

(54) IMAGE FORMING APPARATUS AND CONTROL METHOD FOR IMAGE FORMING APPARATUS FOR CONTROLLING A DIRECT CURRENT TO DIRECT CURRENT CONVERTER TO SUPPLY POWER TO AN USB DEVICE

(71) Applicant: CANON KABUSHIKI KAISHA, Tokyo (JP)

(72) Inventor: Naoto Sasahara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/787,462

(22) Filed: Feb. 11, 2020

(65) Prior Publication Data

US 2020/0267275 A1  Aug. 20, 2020

(30) Foreign Application Priority Data

Feb. 19, 2019  (JP) .............................. JP2019-027184

(51) Int. Cl.
*G06F 1/26* (2006.01)
*G06F 13/42* (2006.01)
*H04N 1/00* (2006.01)
*G06F 1/3234* (2019.01)
*H02M 3/00* (2006.01)

(52) U.S. Cl.
CPC .......... *G06F 13/4282* (2013.01); *G06F 1/266* (2013.01); *G06F 1/3234* (2013.01); *H02M 3/00* (2013.01); *H04N 1/00896* (2013.01); *H04N 1/00904* (2013.01); *H04N 1/00907* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 9,979,214 B2* | 5/2018 | Yang | ..................... | H02J 7/0042 |
| 2007/0245055 A1* | 10/2007 | Minami | ................ | G06F 13/387 |
| | | | | 710/305 |
| 2011/0273742 A1* | 11/2011 | Takiguchi | .......... | G03G 15/5004 |
| | | | | 358/1.15 |
| 2013/0049716 A1* | 2/2013 | Saeki | ..................... | H02M 3/156 |
| | | | | 323/271 |
| 2014/0268222 A1* | 9/2014 | Inoue | .................... | G06F 3/1292 |
| | | | | 358/1.15 |
| 2014/0307279 A1* | 10/2014 | Yasui | .................... | G06F 3/1204 |
| | | | | 358/1.13 |

(Continued)

FOREIGN PATENT DOCUMENTS

JP  2005-253253 A  9/2005

*Primary Examiner* — Miya J Williams
*Assistant Examiner* — Pawan Dhingra
(74) *Attorney, Agent, or Firm* — Canon U.S.A., Inc. IP Division

(57) ABSTRACT

An apparatus, such as an image forming apparatus, includes a Universal Serial Bus (USB) host interface configured to connect to a USB device, a direct current to direct current (DC-DC) converter configured to supply power to the USB device connected to the USB host interface, and a control unit configured to switch the DC-DC converter from a pulse width modulation (PWM) mode to a pulse frequency modulation (PFM) mode based on a type of the USB device connected to the USB host interface.

12 Claims, 7 Drawing Sheets

| | NORMAL STATE | FIRST POWER SAVING STATE | | SECOND POWER SAVING STATE |
|---|---|---|---|---|
| | | PWM-DESIGNATING DEVICE CONNECTED | ONLY PFM-DESIGNATING DEVICE CONNECTED | |
| DC-DC | PWM | PWM | PFM | PFM |
| ENERGIZED STATE OF EACH USB HOST I/F | ALL ENERGIZED | ONLY PWM-DESIGNATING DEVICE ENERGIZED | ALL INTERRUPTED | INTERRUPTED |
| | 701 | 702 | 703 | 704 |

(56) References Cited

U.S. PATENT DOCUMENTS

| | | | |
|---|---|---|---|
| 2015/0153973 A1* | 6/2015 | Kawaguchi | G03G 15/5004 358/1.14 |
| 2015/0179233 A1* | 6/2015 | Kimura | G06F 1/3215 365/226 |
| 2015/0249385 A1* | 9/2015 | Takahashi | H02M 3/156 315/291 |
| 2017/0205867 A1* | 7/2017 | Hasui | H04L 63/00 |
| 2021/0092250 A1* | 3/2021 | Iritani | H04N 1/00835 |

* cited by examiner

FIG.5

| DEVICE TYPE | DC-DC MODE |
|---|---|
| HID | PWM |
| WLAN | PWM |
| CARD READER | PWM |
| STORAGE | PFM |
| HUB | PFM |

FIG. 7

| | NORMAL STATE | FIRST POWER SAVING STATE | | SECOND POWER SAVING STATE |
| --- | --- | --- | --- | --- |
| | | PWM-DESIGNATING DEVICE CONNECTED | ONLY PFM-DESIGNATING DEVICE CONNECTED | |
| DC-DC | PWM | PWM | PFM | PFM |
| ENERGIZED STATE OF EACH USB HOST I/F | ALL ENERGIZED | ONLY PWM-DESIGNATING DEVICE ENERGIZED | ALL INTERRUPTED | INTERRUPTED |
| | 701 | 702 | 703 | 704 |

IMAGE FORMING APPARATUS AND CONTROL METHOD FOR IMAGE FORMING APPARATUS FOR CONTROLLING A DIRECT CURRENT TO DIRECT CURRENT CONVERTER TO SUPPLY POWER TO AN USB DEVICE

BACKGROUND

Field

The present disclosure relates to control of a direct current to direct current (DC-DC) converter that supplies power to a Universal Serial Bus (USB) device connected to a USB host controller mounted on an image forming apparatus.

Description of the Related Art

A host computer mounted with a Universal Serial Bus (USB) interface (I/F) is equipped with a USB host controller. To this type of host computer, for example, a USB storage, a USB card reader, or a USB keyboard can be connected via the USB OF so that each can be used as a device of the host computer.

In the USB 2.0, a device and a host are connected by four lines. The four lines are a Vbus line and a GND line for power supply, and a D+ line and a D− line that are data lines for communication. The data lines are connected to the USB host controller. The Vbus line is supplied with power via a route different from that of the USB host controller.

The power to be supplied to the Vbus line of the USB can be generated by using a direct current to direct current (DC-DC) converter. In general, the DC-DC converter has a pulse width modulation (PWM) mode and a pulse frequency modulation (PFM) mode.

In the PWM mode, output is stable when a load current is large, but power efficiency is low when the load current is small. In the PFM mode, power efficiency is high when the load current is small, but output is unstable n the load current is large.

Japanese Patent Application Laid-Open No. 2005-253253 discusses a technology for automatically switching a DC-DC converter between a PWM mode and a PFM mode, by detecting a magnitude of a load current supplied by the DC-DC converter.

SUMMARY

A user inserts or removes a device into or from the Universal Serial Bus (USB) at anytime. Thus, a USB interface is an interface where a load current often fluctuates. When a device to be supplied with power is present, a direct current to direct current (DC-DC) converter is operated in a pulse width modulation (PWM) mode. However, it is desirable to switch the DC-DC converter to a pulse frequency modulation (PFM) mode to suppress power consumption when the device to be supplied with power is absent.

However, if the mode of the DC-DC converter is switched in response to a change in the load current regardless of a type of a connected USB device as in a conventional technology, the following situation can arise. For example, when the user inserts or removes the USB device, a voltage to be supplied to another connected USB device can become unstable.

The present disclosure features a mechanism that can appropriately switch the mode of a DC-DC converter based on the type of a connected USB device, and accordingly provide an optimum power state.

According to an aspect of the present disclosure, an apparatus, such as an image forming apparatus, includes a USB host interface configured to connect to a USB device, a DC-DC converter configured to supply power to the USB device connected to the USB host interface, and a control unit configured to switch the DC-DC converter from a PWM mode to a PFM mode based on a type of the USB device connected to the USB host interface.

Further features of the present disclosure will become apparent from the following description of exemplary embodiments with reference to the attached drawings.

BRIEF DESCRIPTION OF THE DRAWINGS

FIG. 5 is a table illustrating an example of correspondence information indicating correspondence between a USB device type and a DC-DC mode.

FIG. 7 is a table illustrating a mode of the DC-DC converter and an energized state of each USB host I/T in each power state of the image forming apparatus according to the present exemplary embodiment.

DESCRIPTION OF THE EMBODIMENTS

Exemplary embodiments of the present disclosure will be described below with reference to the drawings. The exemplary embodiments described below are not intended to limit the present disclosure set forth in the claims, and not all combinations of features described in the exemplary embodiments are necessarily indispensable to the solving means of the present disclosure.

Figure 1:
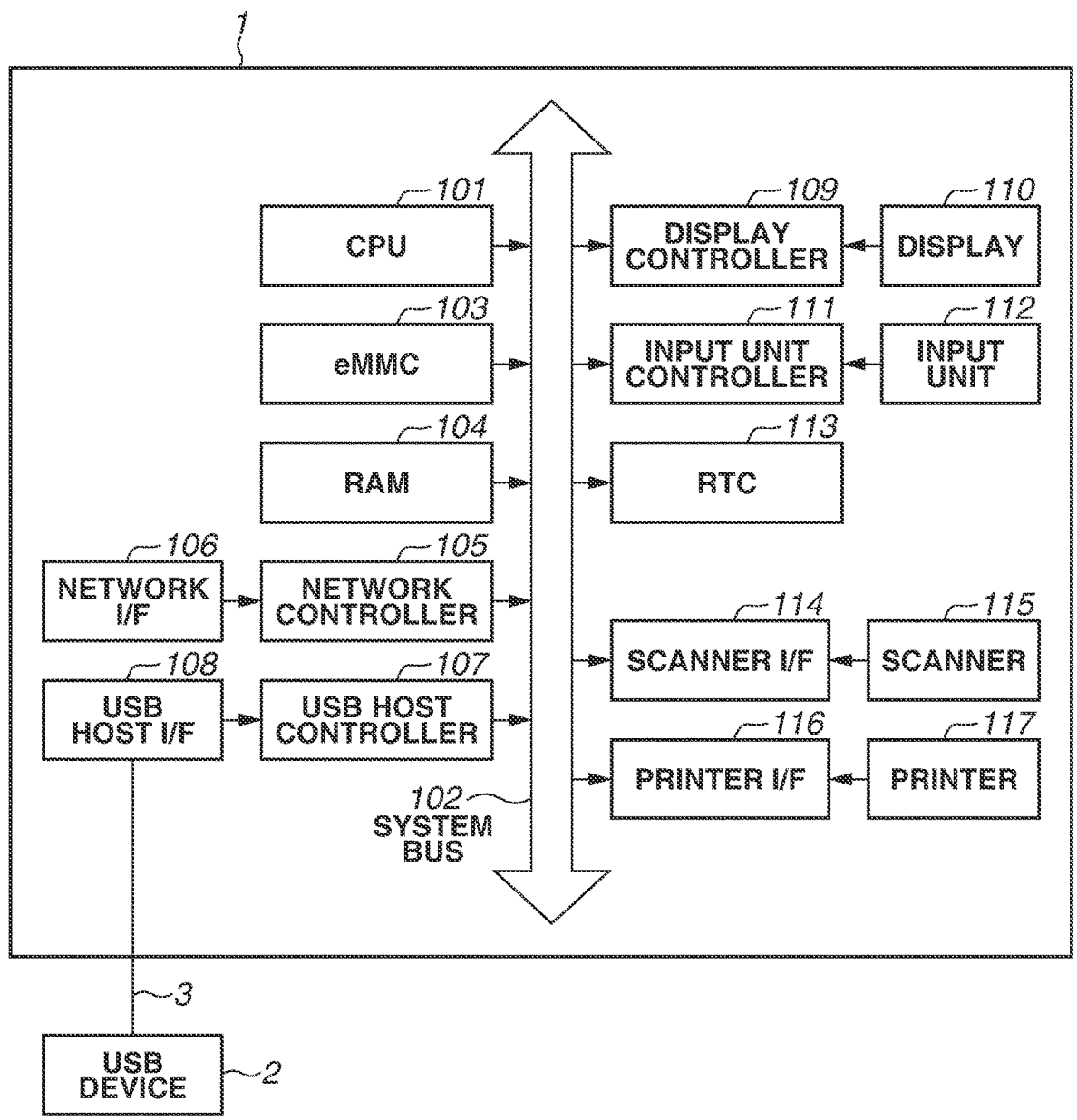
FIG. 1 is a block diagram illustrating an example of a hardware configuration of an image forming apparatus according to an exemplary embodiment.

FIG. 1 is a block diagram illustrating an example of a hardware configuration of an image forming apparatus 1 according to an exemplary embodiment of the present disclosure.

In FIG. 1, a central processing unit (CPU) 101 executes software for operating the image forming apparatus 1. A system bus 102 is a passage for the CPU 101 to access another unit and for other units to access each other.

An embedded Multi Media Card (MMC) 103 stores software of the image forming apparatus 1, and data and a temporary saving file used in operating the image forming apparatus 1. In FIG. 1, the eMMC 103 is illustrated, but other type of nonvolatile storage device such as a hard disk drive (HDD) or a solid state drive (SSD) may be used.

A random access memory (RAM) 104 is used as a work area of the CPU 101. A program of the image forming apparatus 1 is loaded into the RAM 104, and the RAM 104 serves as a storage area for a variable used in operating the program and data transferred from each unit by direct memory access (DMA). A network controller 105 and a network interface (I/F) 106 control communication between the image forming apparatus 1 and another apparatus on a network.

A Universal Serial Bus (USB) host controller 107 and a USB host I/F 108 control communication between the image forming apparatus 1 and a USB device 2.

In the example in FIG. 1, only one USB host I/F 108 is illustrated. However, in actuality, a plurality of USB host I/Fs 108 is present. The USB host I/F 108 is connected to the USB device 2 using a USB cable 3. The USB host I/F 108 can be directly connected to the USB device 2 without use of the USB cable 3, depending on a configuration of the USB device 2.

A display 110 displays an operation status of the image forming apparatus 1 so that a user can check the operation status. A display controller 109 controls display on the display 110.

An input unit 112 receives an instruction for the image forming apparatus 1 from the user. An input unit controller 111 controls the input unit 112. More specifically, the input unit 112 is an input system such as a keyboard, a mouse, a numeric keypad, an arrow pad, a touch panel, or an operation unit keyboard. In a case where the input unit 112 is the touch panel, the input unit 112 is configured to be physically attached to a front side of the display 110.

A real time clock (RTC) 113 provides the image forming apparatus 1 with functions such as a clock function, an alarm function, and a timer function.

A scanner 115 is connected to the image forming apparatus 1 via the system bus 102 and a scanner I/F 114. A printer 117 is connected to the image forming apparatus 1 via the system bus 102 and a printer I/F 116.

Here, transition of a power state of the image forming apparatus 1 will be described with reference to FIG. 6.

Figure 6:
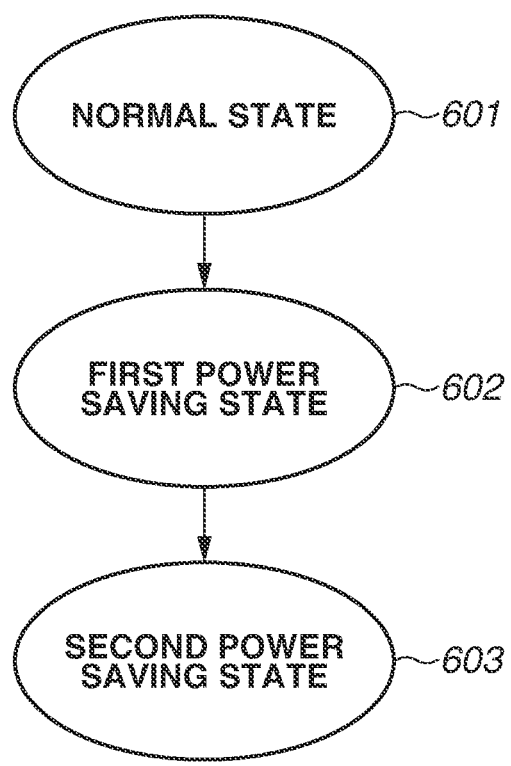
FIG. 6 is a diagram illustrating transition of a power state of the image forming apparatus according to the present exemplary embodiment.

FIG. 6 is a diagram illustrating the transition of the power state of the image forming apparatus 1.

As illustrated in FIG. 6, the image forming apparatus 1 has three power states, i.e., a normal state 601 where all devices are energized, a first power saving state 602 where energization of some of the devices is interrupted, and a second power saving state 603 where a power saving effect is high.

The normal state 601 corresponds to a power state where all the devices are energized. However, it may also include a power state where only the display 110 is turned off.

In the first power saving state 602, energization of the display 110, the display controller 109, the input unit 112, the input unit controller 111, the scanner 115, the scanner I/F 114, the printer 117, and the printer I/F 116 is interrupted. In other words, the first power saving state 602 corresponds to a power state where power consumption is lower than that in the normal state 601.

In the second power saving state 603, energization is further interrupted compared to that in the first power saving state 602, and specifically, energization of the CPU 101 is interrupted. In other words, the second power saving state 603 corresponds to a power state where power consumption is lower than that in the first power saving state 602.

Power supply to the USB device 2 via the USB host I/F 108 in each of the power states will be described below.

Figure 2:
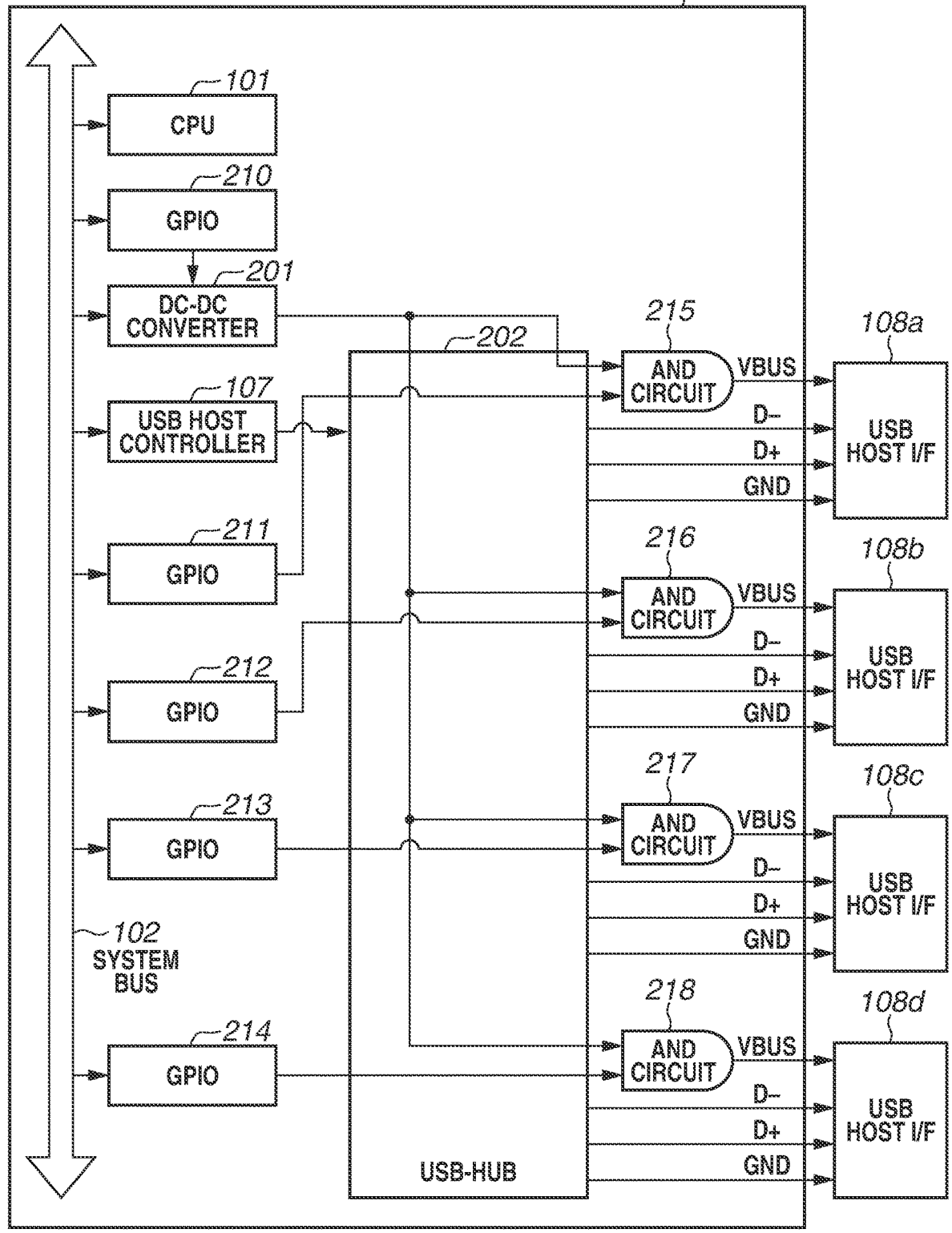
FIG. 2 is a block diagram illustrating an example of a configuration of a Universal Serial Bus (USB) host interface (I/F) mounted on the image forming apparatus according to the present exemplary embodiment, and an example of a configuration that enables control of a Vbus of each USB host I/F.

FIG. 2 is a diagram illustrating an example of a configuration of the USB host I/F 108 mounted on the image forming apparatus 1, and an example of a configuration for enabling control of a Vbus of each of the USB host I/Fs 108.

In FIG. 2, a component same as that in FIG. 1 is indicated with the same reference numeral as that in FIG. 1.

The USB host controller 107 operates based on an instruction from the CPU 101, and communicates with USB devices connected to the USB host I/Fs 108. FIG. 2 illustrates an example of a configuration where a USB-hub 202 is connected to the USB host controller 107, and further, the USB host I/Fs 108 (108a to 108d) are connected to the USB-hub 202. However, each of the USB host I/Fs 108 can be directly connected to the USB host controller 107.

The USB-hub 202 has a function of relaying communication between the USB host controller 107 and each of the USB devices, and can connect the USB host I/Fs 108a to 108d to the USB host controller 107.

When the USB device is connected to each of the USB host I/Fs 108a to 108d, the CPU 101 acquires information about the connected USB device via the USB host controller 107. The information acquired here includes a vendor identification (ID), a product ID, and a class ID. Based on the information, the CPU 101 controls assignment of an appropriate device driver to the USB device. Examples of the device driver to be used by the image forming apparatus 1 include a human interface device (HID) driver, a storage driver, a wireless local area network (WLAN) driver, a general-purpose driver, and a hub driver.

Power to be supplied to the Vbus of each of the USB host I/Fs 108a, 108b, 108c, and 108d is generated by a direct current to direct current (DC-DC) converter 201.

AND circuits 215, 216, 217, and 218 each compute a logical AND of an output value of the DC-DC converter 201 and an output value of corresponding one of general-purpose inputs/outputs (GPIOs) 211, 212, 213, and 214, so that the power is supplied to the Vbus.

The CPU 101 can control OFF/ON of power to be supplied to the USB host I/Fs 108a, 108b, 108c, and 108d by controlling the GPIOs 211, 212, 213, and 214, respectively. Here, a configuration using the AND circuits is described for a simplification purpose, but it is also possible to control OFF/ON of the Vbus using a high side switch and an OR circuit.

The DC-DC converter 201 enters the PWM mode if the CPU 101 writes a High signal in the GPIO 210, and the DC-DC converter 201 enters the PFM mode if the CPU 101 writes a Low signal in the GPIO 210.

Processing by the image forming apparatus 1 according to the present exemplary embodiment will be described below.

Figure 3:
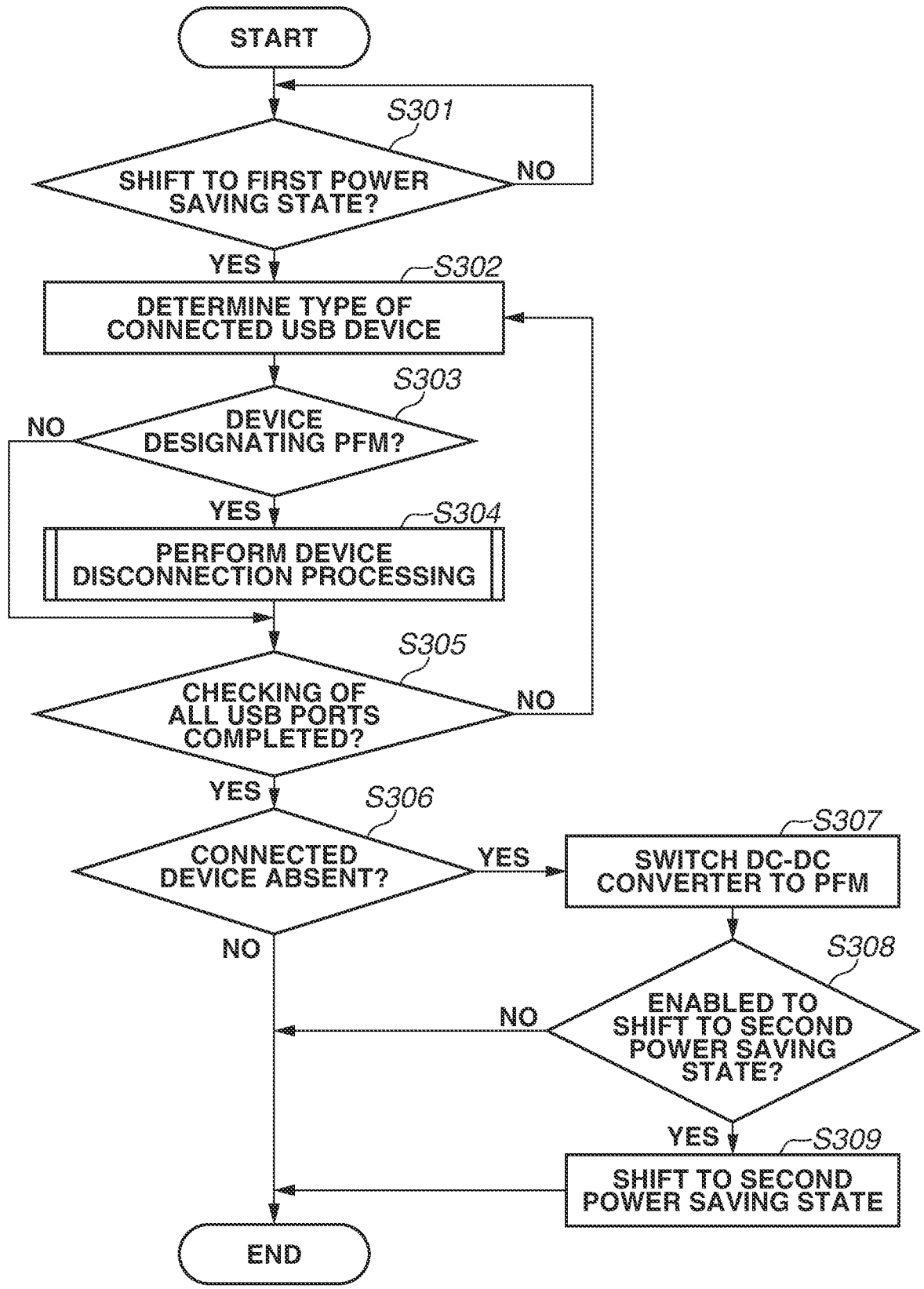
FIG. 3 is a flowchart illustrating an example of processing performed by the image forming apparatus according to the present exemplary embodiment.

FIG. 3 is a flowchart illustrating an example of the processing performed by the image forming apparatus 1 according to the present exemplary embodiment. The CPU 101 loads a program (software for operating the image forming apparatus 1) stored in a device such as the eMMC 103 into the RAM 104 and executes the loaded program as necessary, so that the processing of the flowchart in FIG. 3 and processing of a flowchart in FIG. 4 to be described below are implemented. Hereinafter, the processing to be described below is executed by the CPU 101 unless otherwise specified.

The processing of the flowchart in FIG. 3 is executed in the normal state 601 and, for example, at regular time intervals. In the normal state 601, the DC-DC converter 201 is in the PWM mode, and an energized state of each of the USB host I/Fs 108 is an all energized state (state 701 in FIG. 7 to be described below).

First, in step S301, the CPU 101 monitors the state of the image forming apparatus 1, and determines whether the image forming apparatus 1 is to be shifted to the first power saving state 602. For example, in a case where no operation is performed on the input unit 112 for a predetermined time (preset time for shifting to the first power saving state 602) in the normal state 601, the CPU 101 determines that the image forming apparatus 1 is to be shifted to the first power saving state 602.

If the CPU 101 determines that the image forming apparatus 1 is not to be shifted to the first power saving state 602 (NO in step S301), the CPU 101 continues step S301.

If the CPU 101 determines that the image forming apparatus 1 is to be shifted to the first power saving state 602 (YES in step S301), the CPU 101 starts a shift to the first power saving state 602, and the processing proceeds to step S302. The energization of the display 110, the display controller 109, the input unit 112, the input unit controller 111, the scanner 115, the scanner I/F 114, the printer 117, and the printer I/F 116 is interrupted due to the shift to the first power saving state 602.

In step S302, the CPU 101 selects one USB host I/F 108 not yet processed (not yet processed in step S302) from among the USB host I/Fs 108 as a target USB host I/F 108. Subsequently, the CPU 101 determines the type of the USB device connected to the target USB host I/F 108 (i.e., in a connected state where the power is supplied).

The CPU 101 determines the type of the USB device by checking a file that is created on the RAM 104 and describes information about the connected USB device, and by checking a name of the device driver assigned to the USB device. Here, the CPU 101 determines the type of the USB device based on the driver name.

For example, in a case where the HID driver is assigned, the CPU 101 determines that the type of the USB device is a e.g., a keyboard, or a pointing device such as a mouse. In a case where the storage driver is assigned, the CPU 101 determines that the type of the USB device is a storage, e.g., a USB memory. In a case where the WLAN driver is assigned, the CPU 101 determines that the type of the USB device is a WLAN device. In a case where the general-purpose driver is assigned, the CPU 101 determines that the type of the USB device is a card reader. In a case where the hub driver is assigned, the CPU 101 determines that the type of the USB device is a hub.

In the present exemplary embodiment, the type of the USB device is determined based on the name of the assigned driver. However, the type of the USB device may be determined based on the class ID, the vendor ID, or the product ID.

Next, in step S303, the CPU 101 determines whether the type of the USB device determined in step S302 described above indicates a device designating the PFM mode in correspondence information, which indicates correspondence between the USB device type and a DC-DC mode, illustrated in FIG. 5. The correspondence information will be described below.

FIG. 5 is a diagram illustrating an example of the correspondence information, which indicates the correspondence between the USB device type and the DC-DC mode. The correspondence information is stored beforehand, for example, in the eMMC 103, and the CPU 101 reads out the correspondence information and uses the read-out correspondence information as necessary.

In the example illustrated in FIG. 5, in a case where the USB device type is the HID, the WLAN, or the card reader, the USB device type corresponds to a device designating the PWM mode. In a case where the USB device type is the storage or the hub, the USB device type corresponds to a device designating the PFM mode.

The description continues below referring back to FIG. 3.

If the type of the USB device determined in step S302 described above corresponds to the device designating the PFM mode (YES in step S303), the processing proceeds to step S304.

In step S304, the CPU 101 performs disconnection processing for the target USB device. The disconnection processing for the USB device will be described below with reference to FIG. 4.

Figure 4:
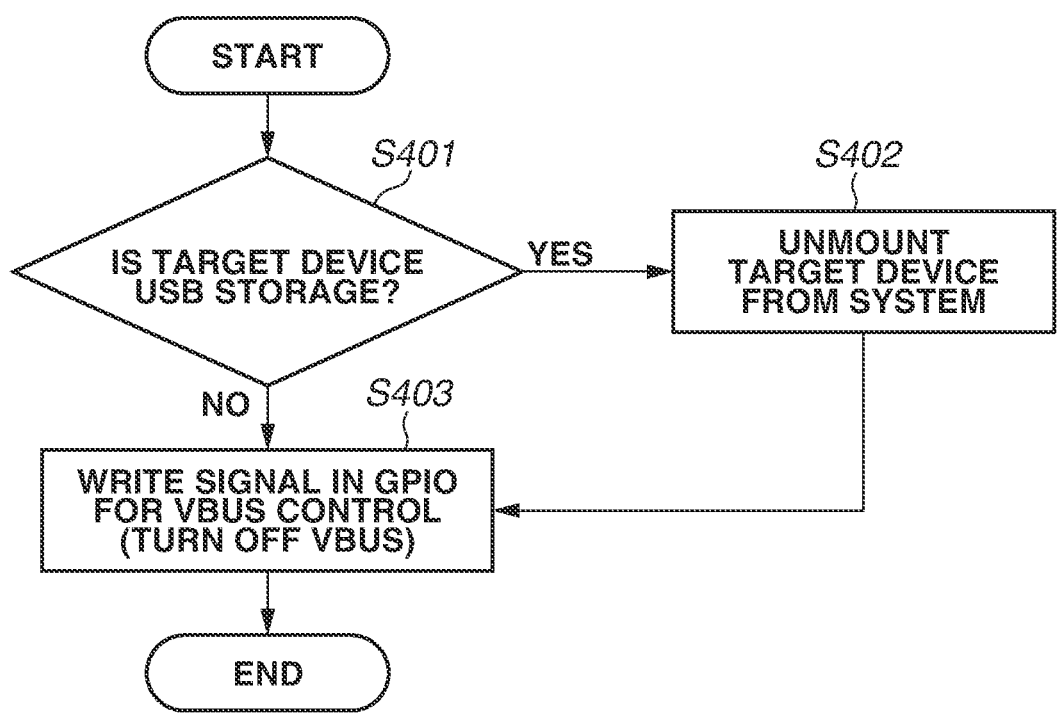
FIG. 4 is a flowchart illustrating an example of disconnection processing for a USB device.

FIG. 4 is a flowchart illustrating an example of the disconnection processing for the USB device.

First, in step S401, the CPU 101 determines whether the target USB device is the USB storage. If the target USB device is the USB storage (YES in step S401), the processing proceeds to step S402.

In step S402, the CPU 101 executes processing for unmounting the target USB device from a system, and the processing proceeds to step S403.

On the other hand, if the target USB device is not the USB storage (NO in step S401), the processing proceeds to step S403.

In step S403, the CPU 101 writes the Low signal in the GPIO (any of the GPIOs 211, 212, 213, and 214) connected to the USB host I/F 108 to which the target USB device is connected. Accordingly, the Vbus connected to the target USB device is turned off to interrupt the power supply, so that the target USB device is disconnected.

After processing in step S403, the disconnection processing for the USB device ends, and the control returns to the flowchart in FIG. 3.

Upon completion of the disconnection processing for the USB device in step S304 described above, the processing proceeds to step S305.

If the type of the USB device determined in step S302 described above does not correspond to the device designating the PFM mode (NO in step S303), the processing proceeds to step S305.

In step S305, the CPU 101 determines whether the checking and the disconnection processing for the connected device in steps S302 to S304 described above have been executed on all the USB host I/Fs 108 (i.e., whether all USB ports have been checked). If there is any USB host I/F 108 that has not been processed yet (NO in step S305), the processing returns to step S302, and the processing is performed on the next USB host I/F 108.

On the other hand, if the checking and the disconnection processing for the connected device are completed for all the USB host I/Fs 108 (YES in step S305), the processing proceeds to step S306. In this way, all the connected devices designating the PFM mode are disconnected (and enter a disconnected state) by step S302 to step S305.

In step S306, the CPU 101 determines whether there is the USB device in the connected state by checking all the USB host I/Fs 108 for presence/absence of the connected USB device. If the USB device in the connected state is present (NO in step S306), i.e., if the device designating the PWM is connected, the processing of this flowchart ends while maintaining the first power saving state 602. In other words, in this case, the DC-DC converter 201 is maintained in the PWM mode, and the energized state of each of the USB host I/Fs 108 is a state where only a PWM-designating device is energized (state 702 in FIG. 7 to be described below).

On the other hand, if the CPU 101 determines that the USB device in the connected state is absent (YES in step S306), the processing proceeds to step S307.

In step S307, the CPU 101 writes the Low in the GPIO 210, and controls the DC-DC converter 201 to switch to the PFM mode.

In step S308, the CPU 101 determines whether the image forming apparatus 1 is in a state of being enabled to shift to the second power saving state 603. For example, in a case where a predetermined time (preset time for shifting to the second power saving state 603) has elapsed after the shift to the first power saving state 602, the CPU 101 determines that the image forming apparatus 1 is in the state of being enabled to shift to the second power saving state 603. The CPU 101 may determine that the image forming apparatus 1 is in the state of being enabled to shift to the second power saving state 603 in a case where each software component operating in the image forming apparatus 1 permits the shift to the second power saving state 603.

If the CPU 101 determines that the image forming apparatus 1 is not in the state of being enabled to shift to the second power saving state 603 (NO in step S308), the processing of this flowchart ends. In other words, in this case, the DC-DC converter 201 is in the PFM mode, and the energized state of each of the USB host I/Fs 108 is an all interrupted state (state 703 in FIG. 7 to be described below).

On the other hand, if the CPU 101 determines that the image forming apparatus 1 is in the state of being enabled to shift to the second power saving state 603 (YES in step S308), the processing proceeds to step S309.

In step S309, the CPU 101 controls the image forming apparatus 1 to shift to the second power saving state 603, and the processing of this flowchart ends. If the shift to the second power saving state 603 occurs, the energization of the CPU 101 is in an interrupted state (but the RAM 104 is in the energized state). In this case, the DC-DC converter 201 is in the PFM mode, and the energized state of each of the USB host I/Fs 108 is an interrupted state (state 704 in FIG. 7 to be described below).

FIG. 7 is a table illustrating an example of each of the modes of the DC-DC converter 201 and the energized state of each of the USB host I/Fs 108 in each of the power states in a case where the power state of the image forming apparatus 1 is changed by the processing in FIG. 3 and FIG. 4.

For example, in a case where the power state of the image forming apparatus 1 is the normal state 601, the DC-DC converter 201 is in the PWM mode, and the energized state of each of the USB host I/Fs 108 is the all energized state, as represented by the state 701 in FIG. 7.

Next, the case is described where the PWM-designating device is connected to each of the USB host I/Fs 108 in a case where the power state of the image forming apparatus 1 is the first power saving state 602. In this case, all the devices designating the PFM mode are disconnected in steps S302 to S305 in FIG. 3, and only the device designating the PWM is in the connected state. Further, the result of the determination in step S306 is NO, and the image forming apparatus 1 maintains the first power saving state 602. In other words, as represented by the state 702 in FIG. 7, the DC-DC converter 201 is in the PWM mode, and the energized state of each of the USB host I/Fs 108 is a state where only the PWM-designating device is energized.

Next, the case is described where only the PFM-designating device is connected to each of the USB host I/Fs 108 in a case where the power state of the image forming apparatus 1 is the first power saving state 602. In this case, all the devices designating the PFM mode are brought into a disconnected state in steps S302 to S305 in FIG. 3. Further, the result of the determination in step S306 is YES, and the DC-DC converter 201 switches to the PFM mode. In other words, as represented by the state 703 in FIG. 7, the DC-DC converter 201 is in the PFM mode, and the energized state of each of the USB host I/Fs 108 is the all interrupted state.

In a case where the image forming apparatus 1 is in the state of being enabled to shift further to the second power saving state 603, the result of the determination in step S308 in FIG. 3 is YES, and the image forming apparatus 1 shifts to the second power saving state 603 in step S309. In this case, as represented by the state 704 in FIG. 7, the DC-DC converter 201 is in the PFM mode, and the energized state of each of the USB host I/Fs 108 is the interrupted state.

In the processing in FIG. 3, there is described the configuration in which the mode of the DC-DC converter 201 is switched (changed) in the case of the first power saving state 602. However, the mode of the DC-DC converter 201 can also be switched (changed) in another power state.

The image forming apparatus 1 can switch the mode of the DC-DC converter 201 based on the type of the connected USB device by performing the processing in the above-described flowchart, in particular, steps S302, S303, and S307. This makes it possible to reduce the power to be consumed by the DC-DC converter 201 when the USB device (e.g., a HID (a noncontact-type card reader), a contact-type card reader, or a wireless LAN device) to be used in a power saving state is not connected. Because the mode of the DC-DC converter 201 is instantly switched, an influence on the time to be consumed for the shift to the power saving state and the return from the power saving state can be minimized.

Thus, the mode of the DC-DC converter 201 can be appropriately switched based on the type of the connected USB device, so that an optimum power state can be provided.

In the present exemplary embodiment, the image forming apparatus is described as an example. However, the present disclosure is also applicable to an apparatus other than the image forming apparatus as long as the apparatus has a USB host I/F and a USB host controller and is configured to supply power to a USB device connected to the USB host I/F. Further, in the present exemplary embodiment, USB is described as an example of a standard used for connecting with an external device. However, the standard is not limited to USB. The present disclosure is also applicable to a configuration in which power is supplied to an external device connected to an external interface compliant a standard other than USB.

For example, the present disclosure is applicable to an apparatus having an external interface for connecting with an external device, and a power supply unit that supplies power to the external device connected to the external interface. Further, the power supply unit is configured to switch between a first mode for stable output and a second mode for high efficiency. Furthermore, a device such as a CPU that is a control unit of the apparatus is configured to perform processing for switching the mode of the power supply unit based on the type of the external device connected to the external interface. Other configurations are substantially the same as those of the above-described exemplary embodiment. Accordingly, the mode of the power supply unit that supplies power to the external interface can be appropriately switched based on the type of the external device connected to the external interface to provide an optimum power state.

Configurations and contents of the above-described various data are not limited to those described herein, and various configurations and contents can be used depending on use or purpose.

While the one exemplary embodiment has been described above, the present disclosure can include an embodiment such as a system, an apparatus, a method, a program, or a storage medium. More specifically, the present disclosure can be applied to a system including a plurality of units or can be applied to an apparatus consisting of one unit.

Further, the present disclosure also includes all configurations each provided by combining the above-described exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-027184, filed Feb. 19, 2019, which is hereby incorporated by reference herein in its entirety.

What is claimed is:

1. An apparatus having a standard power state and a power-saving state in which power consumption is lower than power consumption in the standard power state comprising:
    a Universal Serial Bus (USB) host interface configured to connect to a USB device;
    a direct current to direct current (DC-DC) converter configured to supply power to the USB device connected to the USB host interface; and
    at least one processor configured to operate as a control unit, the control unit being configured
    to maintain a mode of the DC-DC converter to a pulse width modulation (PWM) mode in a case where at least one USB device corresponding to the PWM mode in the power-saving state is connected to the USB host interface when shifting to the power-saving state from the standard power state, and
    to set the mode of the DC-DC converter to a pulse frequency modulation (PFM) mode in a case where no USB device corresponding to the PWM mode in the power-saving state is connected to the USB host interface when shifting to the power-saving state from the standard power state,
    wherein when a USB device corresponding to the PWM mode and a USB device corresponding to the PFM mode are each connected to the USB host interface, the control unit stops power supply from the DC-DC converter to the USB device corresponding to the PFM mode, and
    wherein the control unit sets the DC-DC converter to the PFM mode and stops power supply to all of the USB devices connected to the USB host interface if all of the USB devices connected to the USB host interface corresponds to the PFM mode.

2. The apparatus according claim 1, wherein the apparatus comprises an image forming apparatus.

3. The apparatus according claim 1, further comprising at least one memory configured to operate as a storage unit, the storage unit being configured to store correspondence information indicating correspondence between a mode of the DC-DC converter and a type of the USB device,
    wherein the control unit determines the mode of the DC-DC converter corresponding to the USB device connected to the USB host interface using the correspondence information.

4. The apparatus according claim 1, wherein the control unit determines the type of the USB device based on a name of a device driver assigned to the USB device.

5. The apparatus according claim 1, wherein the control unit determines the type of the USB device based on at least one of a class identification (ID), a vendor ID, and a product ID of the USB device.

6. The apparatus according claim 1, wherein the USB device corresponding to the PWM mode in the power-saving state is determined based on predetermined information stored beforehand.

7. The apparatus according claim 1, further having another power-saving state where the mode of the DC-DC converter is always the pulse frequency modulation (PFM) mode.

8. A control method for an apparatus having a standard power state and a power-saving state in which power consumption is lower than power consumption in the standard power state, the apparatus including a USB host interface configured to connect to a USB device, and a DC-DC converter configured to supply power to the USB device connected to the USB host interface, the control method comprising:
    maintaining a mode of the DC-DC converter to a PWM mode in a case where at least one USB device corresponding to the PWM mode in the power-saving state is connected to the USB host interface when shifting to the power-saving state from the standard power state, and
    setting the mode of the DC-DC converter to a pulse frequency modulation (PFM) mode in a case where no USB device corresponding to the PWM mode in the power-saving state is connected to the USB host interface when shifting to the power-saving state from the standard power state,
    wherein when a USB device corresponding to the PWM mode and a USB device corresponding to the PFM mode are each connected to the USB host interface, the control unit stops power supply from the DC-DC converter to the USB device corresponding to the PFM mode, and wherein the control unit sets the DC-DC converter to the PFM mode and stops power supply to all of the USB devices connected to the USB host interface if all of the USB devices connected to the USB host interface corresponds to the PFM mode.

9. The control method according to claim 8, wherein the apparatus comprises an image forming apparatus.

10. The control method according to claim 8, further comprising:
   storing correspondence information indicating correspondence between a mode of the DC-DC converter and a type of the USB device; and
   determining the mode of the DC-DC converter corresponding to the USB device connected to the USB host interface using the correspondence information.

11. The control method according to claim 8, further comprising determining the type of the USB device based on a name of a device driver assigned to the USB device.

12. The control method according to claim 8, further comprising determining the type of the USB device based on a class ID, a vendor ID, or a product ID of the USB device.

* * * * *